US005121361A

United States Patent [19]

Harrison, Jr. et al.

[11] Patent Number: 5,121,361

[45] Date of Patent: Jun. 9, 1992

[54] PROGRAMMABLE BEAM FORMER

[75] Inventors: William V. Harrison, Jr., Tempe; David E. Vogt, Chandler, both of Ariz.

[73] Assignee: Acoustic Imaging Technologies Corporation, Tempe, Ariz.

[21] Appl. No.: 593,571

[22] Filed: Oct. 5, 1990

Related U.S. Application Data

[63] Continuation of Ser. No. 415,404, Sep. 29, 1989, abandoned, which is a continuation-in-part of Ser. No. 237,874, Aug. 29, 1988, abandoned.

[51] Int. Cl.[5] .......... G03B 42/06

[52] U.S. Cl. .......... 367/7; 367/135

[58] Field of Search .......... 367/7, 11, 103, 105, 367/138, 135; 73/625, 626; 128/660.01, 661.01

[56] References Cited

U.S. PATENT DOCUMENTS

| | | | |
|---|---|---|---|
| 4,305,296 | 12/1981 | Green et al. | 73/626 |
| 4,392,379 | 7/1983 | Yamaguchi | 367/105 |
| 4,528,854 | 7/1985 | Shimazaki | 367/105 |
| 4,638,467 | 1/1987 | Takeuchi | 367/105 |
| 4,811,740 | 3/1989 | Ikeda et al. | 128/660.01 |

*Primary Examiner*—Daniel T. Pihulic

*Attorney, Agent, or Firm*—Christie, Parker & Hale

[57] ABSTRACT

The train of echoes received in an ultrasound imaging system having an array of ultrasound transducers is shaped and/or focused by first and second programmable beam focusing modules in a dynamic receive focus mode. The elemental ultrasound echo signals from a plurality of channels connected to the elements of the transducer array are selectively attenuated and/or phased shifted according to the programs prescribed for the focus zones and combined by each module. The combined echo signals are further processed in conventional fashion. The modules operates alternately. One module is being programmed, while the other module is combining the elemental echo signals for processing. Each beam focusing module comprises a delay line having a plurality of input taps and a cross point switch selectively connecting the channels to the input taps. The module is programmed by selectively closing the individual cross points of the cross point switch. Beam shaping i.e. apodizing, is accomplished by selectively attenuating the echoes prior to application to the input taps of the delay line in each module. The modules can be reconfigured to connect the modules in series in a composite focus mode.

1 Claim, 11 Drawing Sheets

PROGRAMMABLE BEAM FORMER

CROSS-REFERENCE TO RELATED APPLICATIONS

This is a continuation of application Ser. No. 07/415,404, filed Sep. 29, 1989 now abandoned which is a continuation-in-part of application Ser. No. 07/237,874, filed Aug. 29, 1988 now abandoned.

BACKGROUND OF THE INVENTION

This invention relates to ultrasound imaging systems and, more particularly, to a beamforming method and apparatus for such systems.

In single transducer ultrasound imaging systems, the ultrasound beam can only be focused conveniently at a fixed point in the field of view. However, multiple transducer ultrasound imaging systems, i.e. systems that use a linear array of transducer elements, permit the beam to be electronically focused at different depths in the field of view.

Various techniques are employed to phase the component signals received by the respective transducer elements of an array to form a resultant focused beam. For example, Maslak U.S. Pat. No. 4,140,022 discloses mixers individual to the transducer elements and a master delay line. The output of a local oscillator is applied with selective phase shifts to the mixers and the mixer outputs are selectively applied to the taps of the delay line so as to combine coherently the echoes received by the individual transducer elements. The delay line taps are close enough to cause "reasonable" phase coherence and the phase shifts introduced by the mixers and a selectively phase shifted local oscillator complete the focusing function. Each time it is desired to change focal zones, a new set of local oscillator phase shifts is selected and in some cases new delay taps are selected. As echos of one transmitted ultrasound burst are received from increasing depths of the field of view, the suitable focal zones for such depths are selected on a real time basis. Thus, the received echos are processed in a "dynamic receive focus" mode. Although Maslak teaches that the delay line taps can also be changed with each focal zone change, it is contemplated that the delay line taps will not have to be changed so often so as to avoid the use of expensive tap selector switches required to reduce noise.

Yamaguchi U.S. Pat. No. 4,392,379 discloses a pair of phased array circuits for dynamically focusing the echos received by a transducer array in an ultrasound imaging system. Each phased array circuit has a delay line with taps to which the transducer elements are connected by a group of change overswitches. The change-over switches are wired to the delay line taps so as to focus the echos received from different zones in the field of view of the system depending on the switch setting. The two phased array circuits are alternately operated and reset, i.e., while one circuit is operating, the switches of the other circuit are being set. The delays required to focus the received echos depend on the characteristics of the transducer array head. Therefore, the change-over switch wiring is specifically designed for the particular transducer array head with which the system is to be used.

SUMMARY OF THE INVENTION

According to the invention, the train of echoes received in an ultrasound imaging system having an array of ultrasound transducers is shaped and/or focused by first and second programmable beam focusing modules. The elemental ultrasound echo signals from a plurality of channels connected to the elements of the transducer array are selectively attenuated and/or phased shifted according to the programs prescribed for the focus zones and combined by each module. The beam focusing modules are reprogrammed for transducer array heads having different characteristics so many different transducer array heads can be employed in the ultrasound imaging system without compromising the focusing ability of the system. The combined echo signals are further processed in conventional fashion. In a dynamic receive focus mode, the modules operate alternately. One module is being programmed, while the other module is combining the elemental echo signals for processing. As the focal zones are set closer together, less time is required to reprogram the modules because fewer of the channels need to be changed. As a result, the beam of received echoes formed by the transducer array can be rapidly focused from zone to zone moving away from the transducer array, without generating switching transients. Low noise performance can thus be attained in a dynamic receive focus mode without the use of expensive delay line tap selectors or hardwired switch connections.

In the preferred embodiment, each beam focusing module comprises a delay line having a plurality of input taps and a cross point switch selectively connecting the channels to the input taps. The module is programmed by selectively closing the individual cross points of the cross point switch.

A feature of the invention is beam shaping i.e. apodizing by selectively attenuating the echoes prior to combining the elemental echo signals in each module. In the time interval during which the phase shifts of a module are reprogrammed by the cross point switch the selective attenuation is also reprogrammed. Thus, the beam of received echoes can also be shaped from zone to zone moving away from transducer array to optimize the quality of the combined echo signal.

Another feature of the invention is a reconfiguration of the modules to connect the modules in series. As a result, the maximum available delay, i.e., the phase shift of both modules operating together, can be utilized. This can provide the additional delay needed for steering in the doppler and electronic sector scanning modes.

Another feature of the invention is the operation of the beam focusing modules in parallel in a "pseudodynamic receive focus" mode. First both modules are programmed to focus in two adjacent zones without processing echos; second echos are processed with the module focused in one of the zones; third echoes are processed with the module focused in the other zone; and then the modules are reprogrammed to repeat the process in two other zones.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENT

Figure 1:
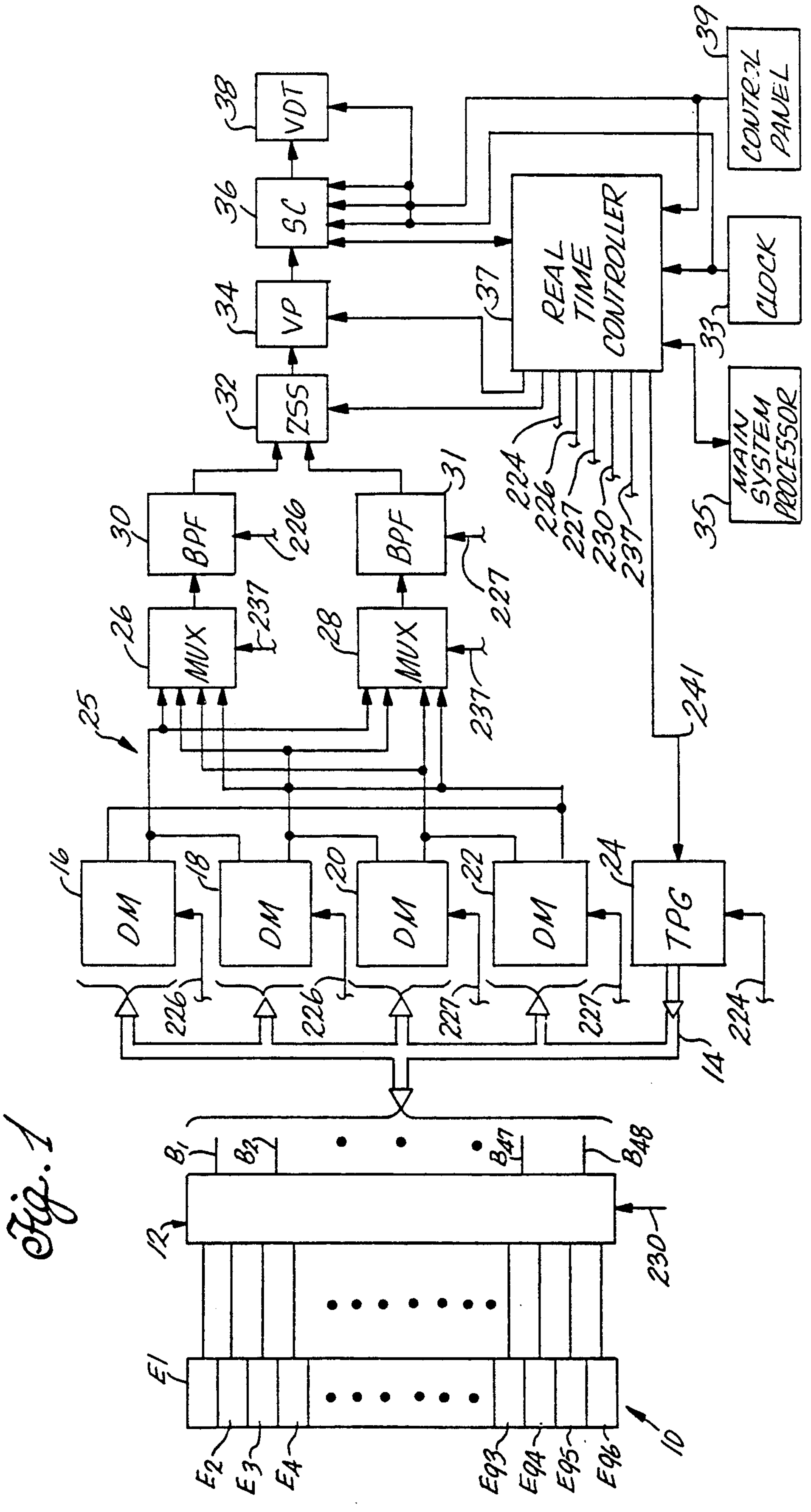
FIG. 1 is a schematic block diagram of an ultrasound imaging system illustrating the principles of the invention.

In FIG. 1, an ultrasound imaging system has an ultrasound transducer array head 10 comprising a plurality (e.g. ninety-six) piezoelectric transducer elements E1, E2, E3, . . . E96. Transducer head 10 could comprise any number of types of arrays, e.g. planar or convex, fixed beam or steered beam. Transducer head 10 is connected to a transmit/receive, element selecting multiplexing network 12 having one half the number (e.g. forty-eight) of pairs of transmit/receive switches SW1, SW2, SW3, . . . SW48 as transducer elements. In the described embodiment, the maximum echo acquisition aperture is forty-eight elements. (A different maximum aperture size could of course be used.) Thus, network 12 selects a group of forty-eight adjacent transducer elements at a time out of the total number of array head 10. If desired, array heads with more elements could be multiplexed by network 12, or a network on board the head itself, into the forty-eight element maximum aperture. Switch pairs SW1, SW2, SW3, . . . SW48 are not shown in FIG. 1. As described in more detail below in connection with FIG. 2, pairs of transducer elements physically spaced apart by forty-seven intervening transducer elements (e.g. E1 and E49, E2 and E50, E3 and E51, etc.) are connected to respective switch pairs (e.g. SW1, SW2, SW3, etc.). Network 12 is connected by a bi-directional bus 14 to identical programmable delay modules (DM) 16, 18, 20, and 22, and to a transmit pulse generator 24. Bus 14 comprises a plurality (e.g. forty eight) of lines B1, B2, B3, . . . B48 corresponding and equal in number to switch pairs SW1, SW2, SW3, . . . SW48. Each switch pair (e.g. SW1), alternately connects one of two transducer elements (e.g. E1 or E49, E2 or E50, E3 or E51, etc.) to the corresponding line (e.g. B1, B2, B3, etc.). Delay modules 16 to 22 are each programmed to block transmission of the signals on some of the lines if desired to change the aperture and thereby permit a constant aperture focal length ratio to be maintained, to introduce one of a plurality (e.g. thirty two) of phase shifts into the signal on each line, to introduce one of a plurality (e.g. forty eight) of attenuation values into the signal on each line, and to combine the phase shifted, attenuated signals to focus and shape the beam of echoes received by transducer head 10. In addition, if transducer head 10 is a steered beam type, delay modules 16 to 22 are programmed to introduce the delay that steers the beam in the desired manner. Transmit pulse generator 24 functions in conventional fashion to produce pulses having a plurality of different phase shifts and to distribute these pulses to the respective transmit switches SW1 to SW48 so as to focus the transmitted beam at selected depths in the field of view of the ultrasound imaging system.

By means of other switches described in detail below, delay modules 16 to 22 can be connected in parallel to operate alternatively or sequentially or connected in series to operate simultaneously.

In the case of parallel alternately operating modules, called the dynamic receive focus mode, the transmitted ultrasound burst is focused at one point in the field of view by transmit pulse generator 24; one or more of delay modules 16 to 22 are operating to focus the echoes received from one zone in the field of view, while the remaining delay modules are being programmed to focus the echoes to be received from the next adjacent zone farther from transducer head 10. Delay modules 16 to 22 alternate between a processing interval and a programming interval in this way to permit rapid real time change of the receive focus. As a result, all the echos of each transmitted ultrasound burst received from the entire depth of the field of view are processed and an entire scan line of video display terminal 38 is produced responsive to such transmitted ultrasound burst. A typical frame rate for the image in this mode is thirty frames per second.

In the case of parallel sequential operating modules, called the pseudo dynamic focus mode, two or more of delay modules 16 to 22 are programmed at the same time to focus in adjacent zones during a non-processing interval, then they successively process echos received from those focal zones in real time during a processing interval. As a result, the echos of each transmitted ultrasound burst received from part of the depth of the field of view are processed and part of a scan line of video display terminal 38 is produced responsive to such transmitted ultrasound burst. A typical frame rate for the image in this mode is seven to fifteen frames per second.

In the case of serial simultaneous operating modules, called the composite mode, all delay modules 16 to 22 operate at the same time and focus in one zone to increase the maximum available delay. The delay modules are programmed to focus in one zone, an ultrasound burst focused near that zone is transmitted by transducer head 10, the echos received from that zone are processed to form part of a scan line, and the cycle is repeated for each zone comprising the depth of the field of view to complete the formation of the scan line. A typical frame rate in this mode is four to eight frames per second depending upon the number of focal zones selected.

To achieve the above described modes, a so called "daisy bus" 25 connects delay module 16 to a four to one multiplexer switch (MUX) 26, a four to one multiplexer switch (MUX) 28, and delay module 18; connects delay module 18 to multiplexer switch 26, multiplexer switch 28, and delay module 20; connects delay module 20 to multiplexer switch 26, multiplexer switch 28, and delay module 22; connects delay module 22 to multiplexer switch 26, multiplexer switch 28, and delay module 16. Thus, bus 25 forms a daisy chain among delay modules 16 to 22 and to switches 26 and 28. Multiplexer switch 26 is coupled by a programmable band pass filter (BPF) 30 to a zone select switch 32. Multiplexer switch 28 is coupled by a programmable band pass filter (BPF) 31 to zone select switch 32. The operation of multiplexer switches 26 and 28 and zone select switch 32 depends on the mode of operation and connection of delay modules 16 to 22, i.e. in parallel or in series. In the dynamic receive focus and pseudo dynamic receive focus modes, zone select switch 32 alternately selects one channel or the other, i.e. the signal from filter 30 or the signal from filter 31; zone select switch disconnects the channel that is not selected to prevent programming noise from influencing the signal on the selected channel. In the composite focus mode, zone select switch 32 selects both channels at the same time. Zone select switch 32 is connected to a video processor (VP) 34, which performs a number of conventional operations, such as demodulation, time gain control, and amplitude compression. The parameters of these operations that depend upon the focal zone are set when the delay modules are programmed. Typically, the transmitted ultrasound bursts are in a frequency range of 2.5 to ten megahertz and the bandwidth of video processor 34 and the apparatus driving it, i.e. the apparatus to the left of video processor 34 in FIG. 1, is seven to twelve megahertz.

The only switching that takes place in the channel that processes the received echoes during the formation of a scan line occurs at zone select switch 32. By careful design of zone select switch 32 therefore introduction of switching transients into the image forming signal can be minimized.

By way of example, in the dynamic receive focus and pseudo dynamic receive focus modes, the output of delay module 16 could be connected to the input of delay module 18 by daisy bus 25 to form one of the beam focusing modules and the output of delay module 20 could be connected to the input of delay module 22 by daisy bus 25 to form another beam focusing module in parallel with the one module. (All four delay modules could be connected in parallel by doubling the number of channels that connect daisy bus 25 to zone select switch 32.) Similarily, in the composite focus mode, the output of delay module 16 could be connected to the input of delay module 18, the daisy output of delay module 18 could be connected to the daisy input of delay module 20, and the output of delay module 20 could be connected to the input of delay module 22 to form in effect a single beam focusing module having the delaying capability which is the sum of all delay modules 16 to 22.

The operation of the beamforming apparatus is coordinated by a real time controller 37, which receives timing pulses a system clock 33 and control signals from clock 33 36. Scan converter also transmits timing pulses to video display terminal 38 and scan converter 36 34 to control the timing of their operations. Each time a scan line, or a portion of a scan line is to be generated, scan converter 36 transmits a control signal to real time controller 37. A random access memory (RAM) in controller 37 stores the files of transmit pulse delay values to focus the transmitted ultrasound bursts in the desired zone(s), the files of delay values to be programmed into delay modules 16 to 22 to focus the received echoes in the desired zones, the files of attenuation values to be programmed into delay modules 16 to 22, if desired, to apodize the aperture, i.e., to shape the received echoes, and the files of aperture size values to be used, if desired, to maintain a constant aperture/focal distance ratio (F number). Responsive to a control signal from scan converter 34, controller 37 actuates transmit pulse generator 24 to transmit an ultrasound burst from transducer head 10. Scan converter 36 also sends a signal to controller 37 at the start of each scan line to tell controller 37 how to set the transmit/receive switches of network 12 to select the right combination of transducer elements E1, E2, E3, . . . E96 for the particular scan line number. While a scan line is being formed, depth clock pulses synchronized to clock 33 time the operation of controller 37, for example one pulse for each millimeter of depth of propagation of the ultrasound energy through the field of view. A typical depth of field is twenty centimeters. The depth clock pulses also control the programming of delay modules 16 to 22 by controller 37, delivering the delay, attenuation, and aperture size files to the delay modules at the proper time to focus and shape the received beam of echoes. Finally, the depth clock pulses control the operation of zone select switch 32 by controller 37 to connect only one channel at a time to video processor 34 in the dynamic and pseudo dynamic modes.

The beamforming apparatus can easily be adapted to function with different types and sizes of transducer heads and to operate in different modes, i.e. composite focus, dynamic, and pseudo dynamic modes. Each time a new transducer head is connected to the beamforming apparatus the applicable files are loaded from a main system processor 35 into the RAM of controller 37 and each time a different mode is selected by a setting at a control panel 39, daisy bus 25 is reconfigured to satisfy the operating mode selected by control panel 39 control panel.

Figure 2:
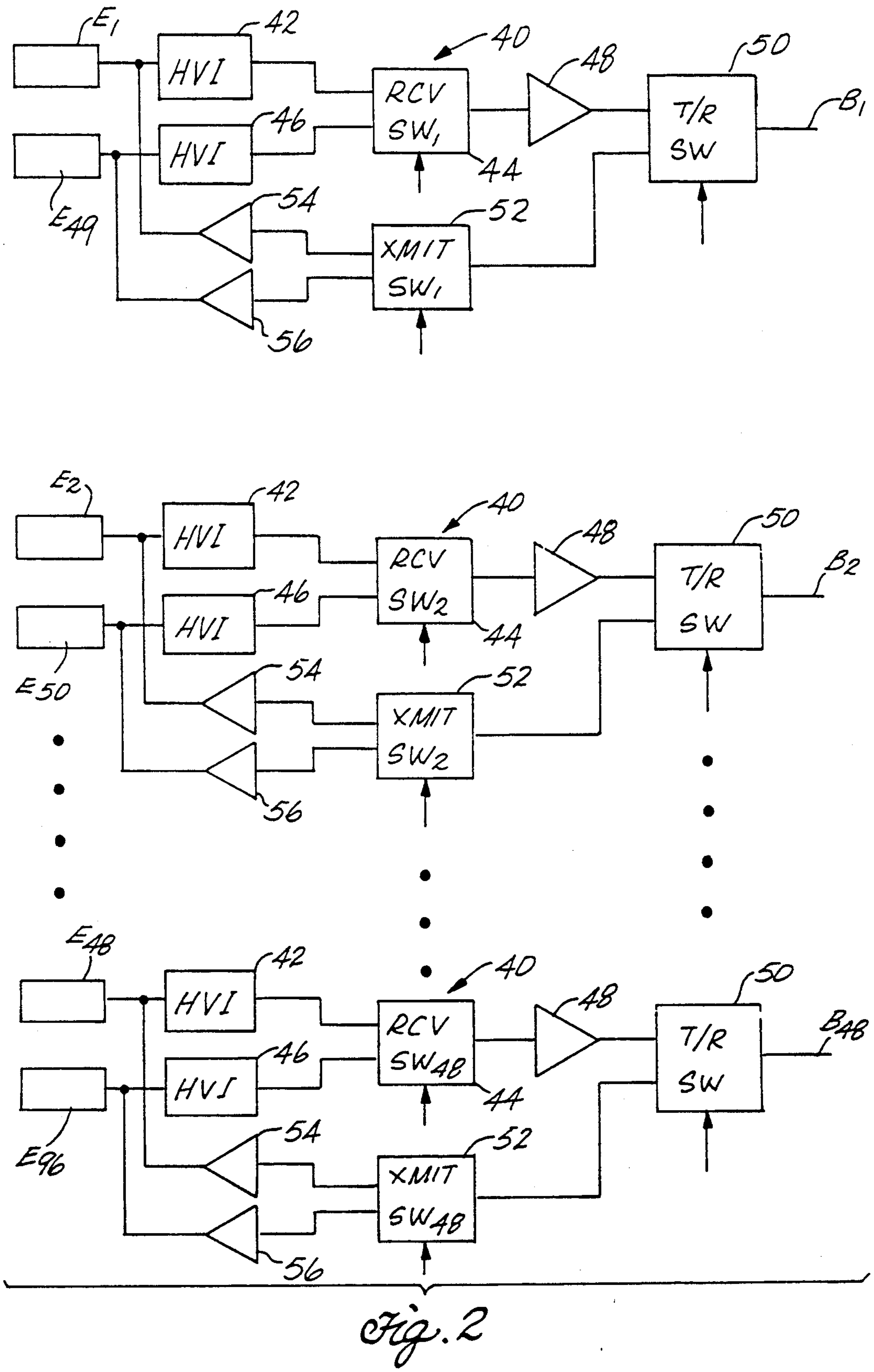
FIG. 2 is a schematic block diagram of the transmit/receive element selecting multiplexing network of FIG. 1.

In FIG. 2, network 12 comprises a plurality (e.g. forty eight) of identical transmit/receive sections 40. There are half as many sections 40 as transducer elements (e.g. ninty six) in transducer head 10. Each section 40 is alternatively connected to two transducer elements of head 10. One of the two elements is connected by a high voltage isolation circuit (HVI) 42 to a receive switch (RCV SW) 44. The other element is connected by a high voltage isolation circuit 46 (HVI) to receive switch 44. Receive switch 44 is connected by an amplifier 48 to a transmit/receive control switch (T/R SW) 50. Control switch 50 is connected by a transmit switch (XMIT SW) 52 to the one element by a high voltage pulser amplifier 54 and to the other element by a high voltage pulser amplifier 56. Pulsers 54 and 56 generate a high frequency burst of electrical energy when triggered by an input pulse to excit the transducer element to which it is connected to emit a corresponding ultrasound burst. Signals are carried to and from control switch 50 by a line of bus 14. Pairs of transducer elements physically spaced apart by forty-seven intervening elements are alternatively routed by each section 40 to one line of bus 14. Thus, element El or E49 is routed to line B1. Element E2 or E50 is routed to line B2. Element E48 or E98 is routed to line B48.

In operation of head 10, up to forty-eight adjacent elements are activated at a time during one transmit/receive cycle, depending upon the desired aperture size. After each cycle, the forty-eight active elements shift one element position. Thus, there are forty-eight cycles each of which present an ultrasound transmit/receive aperture forty-eight elements wide. The activated elements are selected by operating receive switches 44 and transmit switches 52. In a position A, receive switch 44 is connected to circuit 42 and transmit switch 52 is connected to amplifier 54; thus the upper element of each pair is activated. In a position B, receive switch 40 is connected to circuit 46 and transmit switch 52 is connected to amplifier 56; thus the lower element of each pair is activated. In a typical mode of operation, during the first transmit/receive cycle, all switches 44 and 52 are in position A. During the second cycle, switches 44 and 52 of the first section change to position B. During the next cycle switches 44 and 52 of the second section 40 switch change to position B. During each subsequent cycle, receive switch 44 and transmit switch 52 of one section 40 change to position B. In this way, the forty-eight element transmit/receive aperture moves from one end of the transducer array to the other and the elemental signal segments of the aperture applied to each of lines B1 to B48 rotates. For example, when all switches 44 and 52 are in position A, the right end segment of the aperture is connected to line B1, the left end segment is connected to line B48, and the intermediate aperture segments are connected to lines B2 to B47, respectively; during the next cycle when switches 44 and 52 of the first section change to position B, the right end segment of the aperture is connected to line B2, the left end segment is connected to line B1, and the intermediate aperture segments are connected to lines B3 to B48; during the next cycle when switches 44 and 52 of the second section change to position B, the right end segment of the aperture is connected to line B3, the left end segment is connected to line B2, and the intermediate aperture segments are connected to lines B4 to B1; and as the aperture moves through the rest of the transducer array, the aperture segments connected to lines B1 to B48 continue to rotate in the same way. During each cycle, switches 50 are positioned to route the transmit pulses to transmit switches 52 and are thereafter positioned to receive elemental echo signals from amplifier 48.

Figure 3:
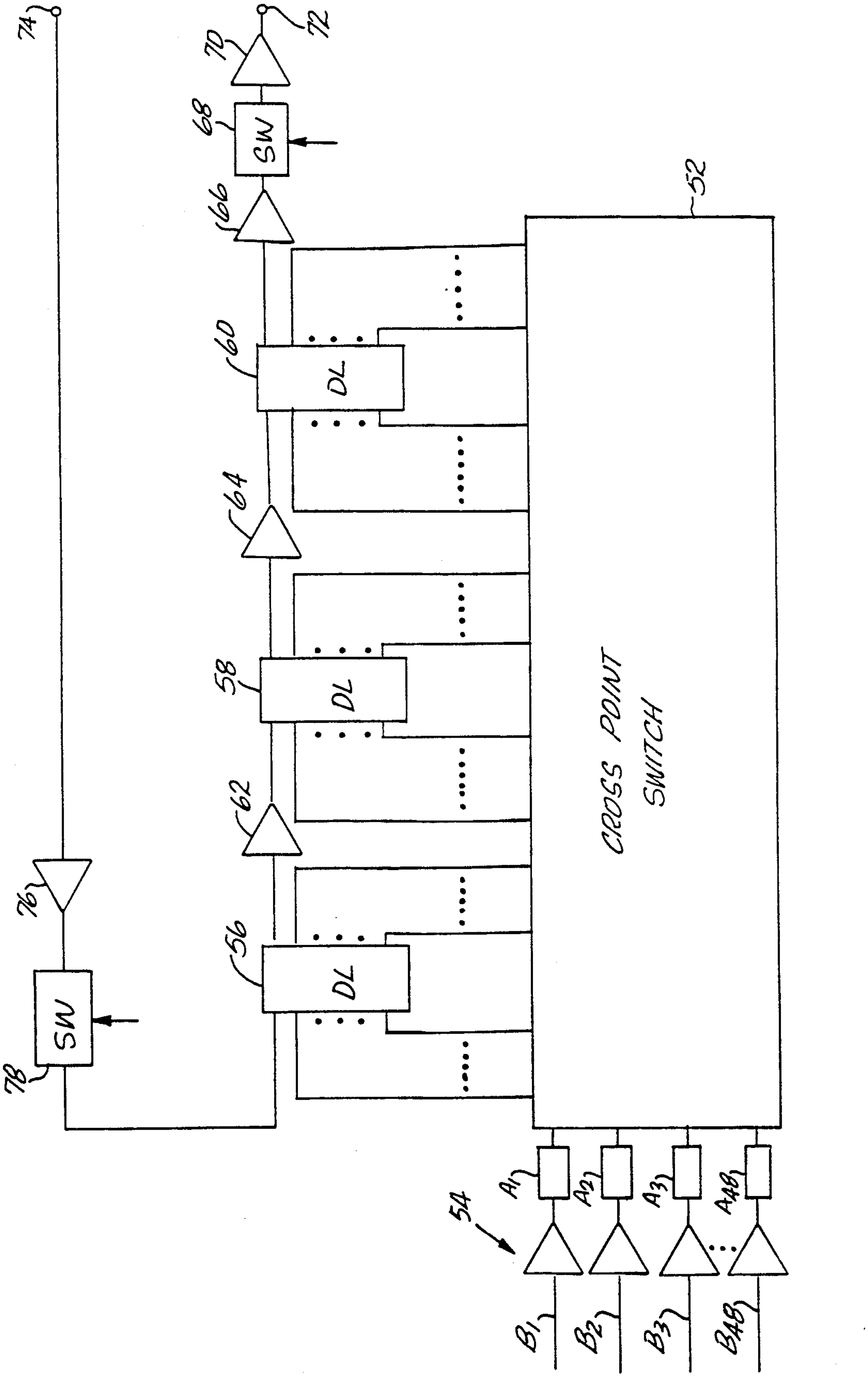
FIG. 3 is schematic block diagram of one of the signal delay modules of FIG. 1.

As depicted in FIG. 3, each delay module 16 to 22 has a cross point switch 52. Cross point switch 52 has forty-eight rows, thirty-two columns, and fifteen hundred seventy-six cross points, which can be selectively closed to connect any row to any column. Lines B1, B2, B3, . . . B48 of bus 14 are connected by transconductance amplifiers 54 and apodizers A1, A2, A3, . . . A48 to the respective horizontal rows of cross point switch 52 to convert the voltages transmitted by bus 14 to currents that are individually programmable in amplitude. Cross point switch 52 is programmed to route the signals from bus 14 to any of its columns or to none of its columns. In the latter case, crosspoint switch 52 blocks transmission of a signal from a transducer element. A delay line comprises delay line segments (DL) 56, 58 and 60, each of which has an input tap, an output tap, and a plurality of intermediate taps. The input tap and the intermediate taps introduce different delays in the signal arriving at the output tap. The output tap of delay line segment 56 is connected by a frequency compensating amplifier 62 to the input tap of delay line segment 58. The output tap of delay line segment 58 is connected by a frequency compensating amplifier 54 to the input tap of delay line segment 60. Amplifier 54 extends the bandwidth of the system. The thirty-two horizontal columns of cross point switch 52 connected directly to by respective taps of the delay line. Each tap of the delay line introduces a different delay into the signal applied thereto and combines this delayed signal with the delayed signals applied to the other taps. The delayed combined signals appear at the output tap of delay line segment 60. Typically, the described delay line would introduce up to twelve hundred eighty nanoseconds of delay in forty nanosecond increments, depending upon the delay line tap to which a signal is applied. The signals transmitted to cross point switch 52 by bus 14 are selectively routed by cross point switch 52 to the delay line taps that introduce the desired delays to focus the received beam of echoes in the prescribed zone of the field of view. Prior to application of the signals to cross point switch 52, they are attenuated by apodizers A1 to A48 to shape the received beam of echoes. To reduce the aperture size to maintain a constant aperture/focal distance ratio, selective lines of bus 14 are blocked by cross point switch 52 or the applicable apodizers are programmed to attenuate the entire signal.

The output tap of delay line segment 60 is coupled by a buffer amplifier 66 to a switch 68. Switch 68 is opened during each programming interval to insure that switching noise associated with the programming operation is confined to the delay module and is closed during each processing interval. To insure that transient noise from the operation of switch 68 does not affect the video signal delivered to video processor 34, switch 68 is opened and closed while zone select switch 32 is not selecting the channel to which the delay line is connected by daisy bus 25. Switch 68 is coupled by a buffer amplifier 70 to an output terminal 72, which is connected to a line of daisy bus 25, as described above in connection with FIG. 1. Input terminal 74, which is also connected to a line of the daisy bus, is coupled by a buffer amplifier 76 to a switch 78. Switch 78 is connected to the input tap of delay line segment 76. The state of switch 78, i.e., opened or closed, depends upon the mode of operation of the ultrasound imaging system and the desired daisy bus interconnection between delay modules. Switch 78 retains the same state during the entire period of operation in a particular mode. Its state is changed from control panel 39 when delay modules 16 to 22 are reconfigured.

Figure 4:
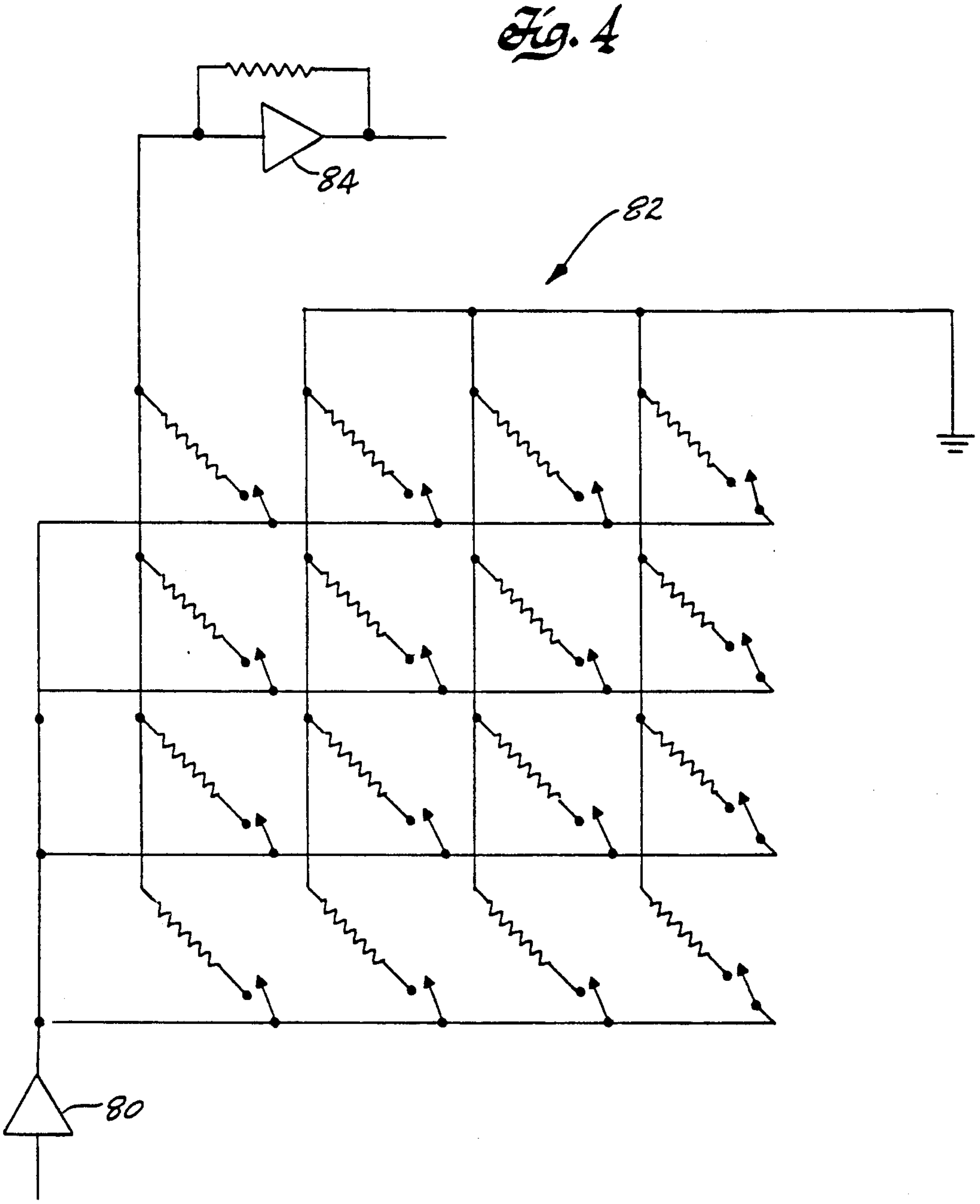
FIG. 4 is a schematic circuit diagram of one of the signal attenuating apodizers of FIG. 3.
Figure 5:
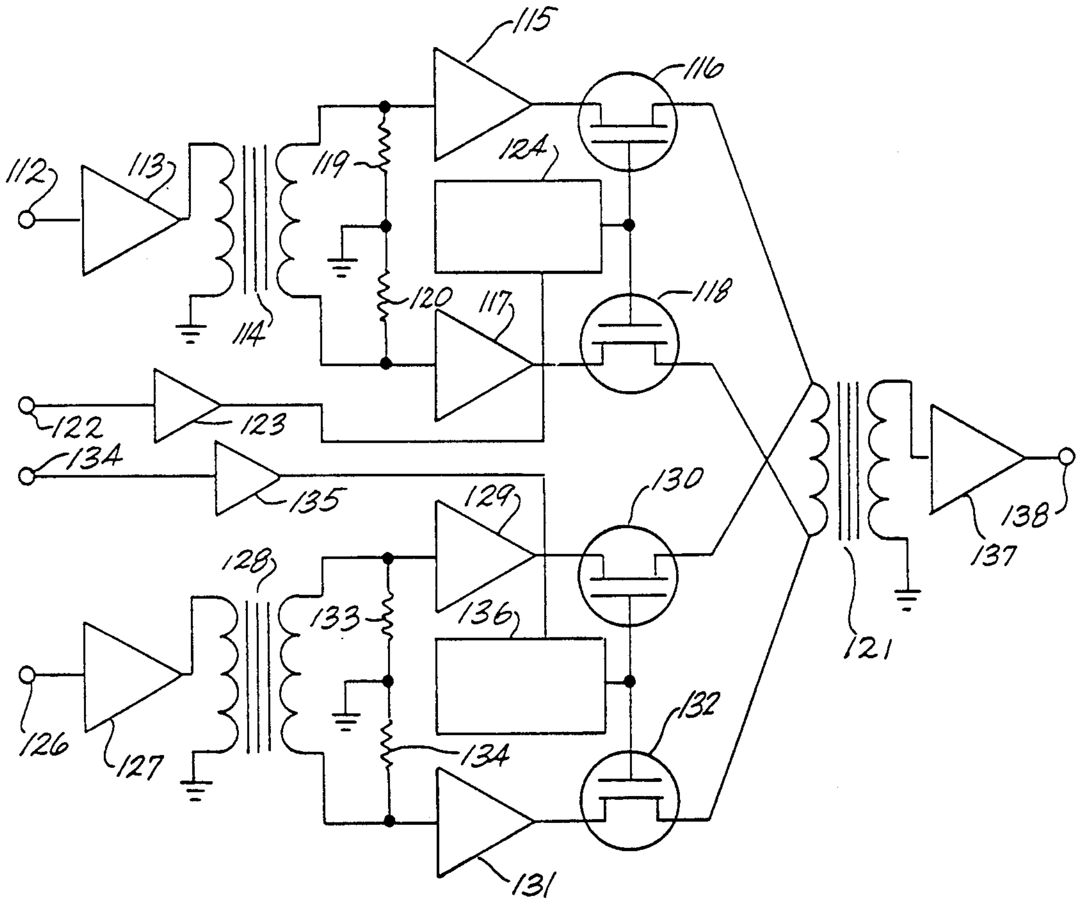
FIG. 5 is a schematic circuit diagram of the zone select switch of FIG. 1.

In FIG. 4, one of apodizers A1 to A48 is shown. The applicable row of cross point switch 52 is coupled by the corresponding transconductance amplifier 54 to all the rows of a four row, four-column cross point switch 82. One of the rows of cross point switch 82 is connected to the input of a low impedance operational amplifier 84, the output of which is connected to the applicable delay line tap. The other three rows are connected to ground. Each of the sixteen cross points has an internal resistance represented in FIG. 4 by a resistor which affects the attenuation introduced by the apodizer only if the corresponding cross point switching element is closed. Cross point switch 82 is thus programmed by selectively closing the cross point switching elements to function as a variable current divider. Depending upon the states of the cross point switching elements, any one of forty eight different attenuation values can be introduced by cross point switch 82.

Figure 6:
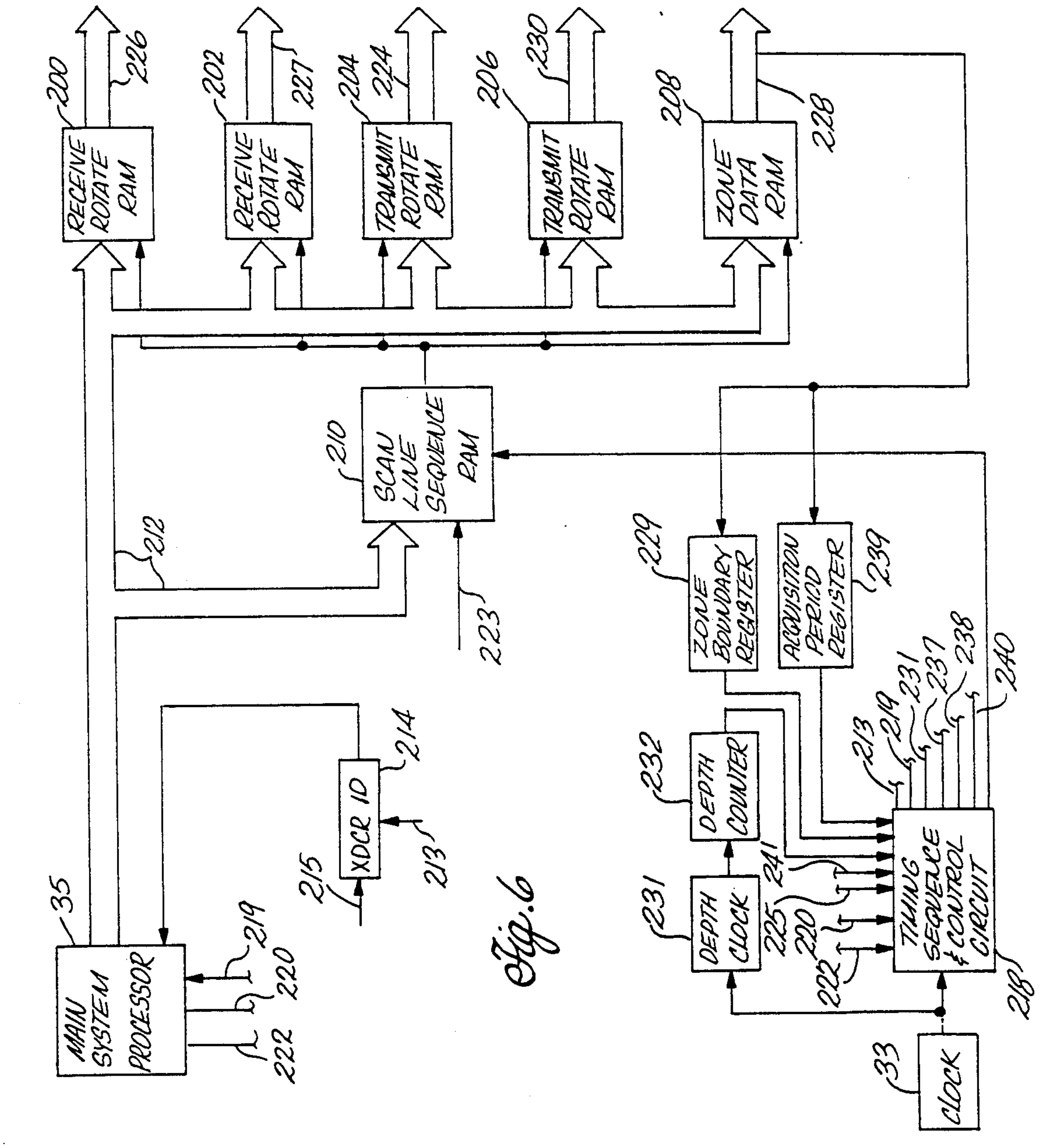
FIG. 6 is a schematic block diagram of the real time controller of FIG. 1.

FIG. 6 shows zone select switch 32. Since video processor 34 receives its signal from zone select switch 32, it is important that zone select switch 32 isolate the channels connected to its inputs and introduce the same gain into the selected channel without substantial switching noise transients. To this end, an input terminal 112 receives the video signal on one channel. Input terminal 112 is coupled by a buffer amplifier 113 to the primary of a transformer 114 to form a double-ended signal at the secondary. One tap of the secondary of transformer 114 is connected by a buffer amplifier 115 to the source of a field effect transistor 116. The other end tap of secondary is connected by a buffer amplifier 117 to the source of a field effect transistor 118. The signals applied to the inputs of amplifiers 115 and 117 are 180° out of phase. The inputs of buffer amplifiers 115 and 117 are connected by signal balancing resistors 119 and 120 respectively to ground. The drain of transistor 116 is connected to one end tap of the primary of a signal combining transformer 121. The drain of transistor 118 is connected to the other end tap of the primary of transformer 121. Control pulses from real time controller 37 are applied to an enable terminal 122. Enable terminal 122 is coupled by an amplifier 123 to a pulse shaper 124. Pulse shaper 124 is connected to the gates of transistors 116 and 118 to turn them on and off at the same time. An input terminal 126 receives the video signal on the other channel. Input terminal 126 is coupled by a buffer amplifier 127 to the primary of a transformer 128 to form a double-ended signal. One tap of the secondary of transformer 128 is connected by a buffer amplifier 129 to the source of a field effect transistor 130. The other end tap of secondary is connected by a buffer amplifier 131 to the source of a field effect transistor 132. The signals applied to the inputs of amplifiers 129 and 131 are 180 out of phase. The inputs of buffer amplifiers 129 and 131 are connected by signal balancing resistors 133 and 134 respectively to ground. The drain of transistor 130 is connected to one end tap of the primary of a signal combining transformer 121. The drain of transistor 132 is connected to the other end tap of the primary of transformer 121. Control pulses from real time controller 37 are applied to an enable terminal 134. Enable terminal 134 is coupled by an amplifier 135 to a pulse shaper 136. Pulse shaper 136 is connected to the gates of transistors 130 and 132 to turn them on and off at the same time.

The secondary of transformer 121 is connected by a buffer amplifier 137 to an output terminal 138 to form a signal ended output signal. Preferably, transistors 116, 118, 130 and 132 are all incorporated on a monolithic integrated circuit so their low impedence and high impedence states are closely matched and the resulting performance of the zone select switch is symmetrical. Pulse shapers 124 and 136 produce symmetrical, slightly overlapping gating signals for transistors 116 and 118 and transistors 130 and 132. Thus, one pair of transistors, e.g. 116 and 118, are switching from on to off while the other pair of transistors, e.g. 130 and 132, are switching from off to on and smooth transistion results having minimal effect on the quality of the signal applied to video processor 34. The switching noise generated by transistor 116 is cancelled by the switching noise generated by transistor 118 because of the 180° phase relationship therebetween. Likewise, the switching noise generated by transistor 130 is cancelled by the switching noise generated by transistor 132 because of the 180° phase relationship therebetween.

As illustrated in FIG. 6, real time controller 37 has a receive rotate RAM 200, a receive rotate RAM 202, a transmit RAM 204, a pulser receiver and daisy bus RAM 206, a zone data RAM 208, and a scan line sequence RAM 210 connected by a data bus 212 to main system processor 35. RAM 200 stores the data files for programming delay modules 16 and 18 to form the beam in each focal zone where delay modules 16 and 18 are connected to video processor 34, e.g., zones 1, 3, 5, and 7, and for programming filter 30 to track the depth of the received echos. RAM 202 stores the data files for programming delay modules 20 and 22 to form the beam in each focal zone where delay modules 20 and 22 are connected to video processor 34, e.g., zones 2, 4, 6, and 8, and for programming filter 31 to track the depth of the received echos. RAM 204 stores the data files for programming transmit pulse generator 24 to focus the transmitted beam at selected focus zones. The data files stored in RAM's 200, 202, and 204 are generally different for each mode. RAM 206 stores the data files that control the positions of the transmit/receive switches in multiplexing network 12, depending upon the scan line number and the scan line type of the display being formed. Zone data RAM 208 stores the data files that define the focal zone boundaries in the DRF mode in terms of depth clock pulses, define the data acquisition periods (ACQ ENABLE), which depend on the selected number and location of transmit focus zones, determine the daisy bus connections, specify the selected input to video processor 34, program filters 30 and 31, and set the video processor parameters for the focal zone being processed. Scan line sequence RAM 210 stores the starting address of the set of phase shift values and the starring address of the set of attenuation values for each focal zone stored in receive rotate RAMs 200 and 202 and an index vale for each scan line to order the phase shift and attenuation values properly relative to the rotation of the transmit/receive aperture segments of transducer head 10 connected to lines B1 to B48.

The downloading operation of data files for a particular transducer connected to the ultrasound imaging system will now be described. The transducer operating with the ultrasound imaging system generates a digital transducer identifying signal that is transferred to a XDCR ID register 214 over a data bus 215. System clock 33 applies timing signals to a timing, sequence, and control (TSC) circuit 218. TSC circuit 218 periodically interrogates XDCR ID register 214 via a bus 213 to determine when a new transducer is connected to the system, which changes the transducer identifying signal in register 214. When TSC circuit 218 detects such a change, it starts the load mode by setting a flag bit, which is sent to processor 35 over a control bus 219 along with the transducer identifying signal stored in register 214. Responsive to the flag bit, processor 35 searches for the files associated with the identified transducer. After these files are located in the memory of processor 35, processor 35 sets a load bit, which is sent to TSC circuit 218 over a control bus 220. As a result, real time controller 37 enters the load mode and the files for the identified transducer are downloaded from processor 35 to RAMs 200 to 210 over data bus 212. Then, processor 35 verifies that the correct files have been downloaded to real time controller 37 and sets a run bit, which is sent to TSC circuit 218 over a control bus 222. Responsive to the run bit, real time controller 37 is set in the run (acquisition) mode and system control is transferred from processor 35 to scan converter 36.

In the run mode, real time controller 37 serves as an interface between the delay modules and scan converter 36, to which the delay modules are synchronized. At control panel 39, the operator selects the transmit focal zone or zones to be used for the display, which is sent to scan converter 36. Each scan line displayed on video display terminal 38 is formed by a number of scan line segments equal to the selected number of transmit focal zones, e.g., if only one transmit focal zone is selected, there is one scan line segment that makes up the entire scan line; if three transmit focal zones are selected, there are three scan line segments that make up the entire scan line. An ACQ ENABLE signal defines the acquisition periods during which the received echos are stored in scan converter 36 to compose the scan lines in the display. For the purpose of discussion, it is assumed that consecutive transmit focal zones must be selected, e.g., zones 1, 2, and 3; zones 3, 4, 5, and 6; or zones 7 and 8. Scan converter 36 sends control data to real time controller 37 over a data bus 223 each time a new scan line or scan line segment is formed by scan converter 36. The control data comprises the scan line number, the scan line type, the transmit focal zone, and an end of line indication.

The scan line density in the display can increased relative to the number of transducer elements in the array, e.g., ninety six, by alternating an even number and odd number of transducer elements in the transmit and/or receive aperture on successive scan lines. For example, alternating between an even number and an odd number of transmitting elements, while maintaining an even number of receiving elements, produces twice the number of scan lines as elements spaced apart one half the spacing between elements. Alternating between an even number and an odd number of transmitting elements and an even number and an odd number of receive elements on successive scan lines, produces four times the number of scan lines as elements spaced apart one quarter the spacing between elements. In the latter case, an exemplary sequence would be as follows: transmit on elements 1 to 4 (even), receive on elements 1 to 4 (even); transmit on elements 1 to 5 (odd), receive on elements 1 to 4 (even); transmit on elements 1 to 5 (odd), receive on elements 1 to 5 (odd); transmit on elements 1 to 5 (odd), receive on elements 2 to 5 (even); repeat sequence beginning with elements 2 to 5 (even). If it is desired to increase the line density in this manner, separate banks of data files must be stored in RAM 204 for an even element transmit aperture and an odd element transmit aperture, and separate banks of data files must be stored in each of RAMs 200 and 202 for an even element receive aperture and an odd element receive aperture.

Depending upon the transmit focal zone of the scan line segment being acquired and the number and locations of the transmit focal zones of the other segments that form the scan line, real time controller 37 determines the acquisition periods and signals (ACQ ENABLE) scan converter 36 when to acquire echo signal data from the delay modules. The data used to determine the acquisition periods is stored in ROM 208 and retrieved responsive to the transmit focal zone data for the present scan line segment and the end of line indication. After all the echo signal data required to form a scan line of the display has been acquired, scan converter 36 signals (XDR ACQ) real time controller 36 to end the acquisition period of the last scan line segment.

Figure 9:
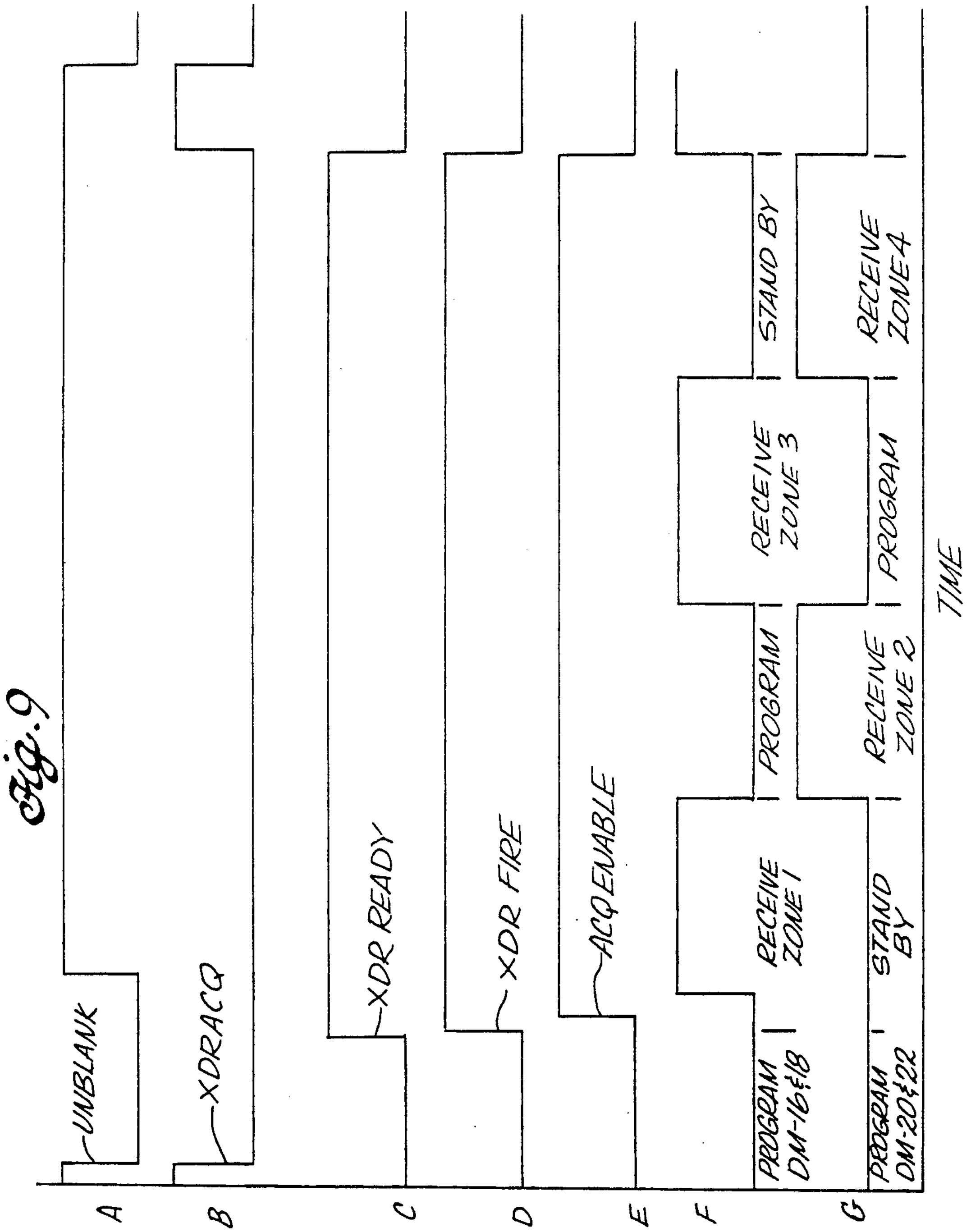
FIGS. 9 to 11 are waveform diagrams illustrating the operation of the real time controller and the scan converter.

Depending upon the mode selected from control panel 39, e.g. DRF, composite, or pseudo DRF, a signal is sent to TSC circuit 218 to set the mode flag bits therein. The mode flag bits in TSC circuit 218 in turn set the state of multiplexer switches 26 and 28 via a bus 237. When the dynamic receive mode flag bits are set, the following operations are started by each negative going pulse transition of the unblinking signal generated by scan converter 36 for video display terminal 38, as represented by FIG. 9A. The unblanking signal is synchronized to system clock 33. The scan line number, scan line type, and transmit focal zone data are sent to RAM 210 over a bus 223 and, as represented by FIG. 9B, scan converter 36 sends a XDR ACQ signal over a bus 225 to TSC circuit 218 to request a new scan line or scan line segment for display. Thereupon, real time controller 37 begins to program transmit pulse generator 24, delay modules 16 to 22, and filters 30 and 31. RAM 210 stores the address in RAM 204 of the set of phase shift values for each of a plurality (e.g., eight) of transmit focal zones with an identifying tag. RAM 210 also stores the index value for each scan line number. Upon receipt of the XDR ACQ signal, TSC circuit 218 searches in RAM 210 to find the identifying tag for the transmit focal zone received from scan converter 36, transfers from RAM 210 to RAM 204 the address of the set of phase shift values having this identifying tag, and transfers from RAM 210 to RAM 204 the index value corresponding to the scan line number received from scan converter 36. RAM 210 also stores in sequence the address in RAM 200 or RAM 202 of the set of phase shift values, the set of attenuation values, and the set of frequency band tracking values of filters 30 and 31 for each of the receive focal zones. If the system employs increased scan line density as described above, RAM 210 also stores a scan line map that relates the scan line number to the address of the particular bank in RAMs 204, 200, and 202. Upon receipt of the XDR ACQ signal, TSC circuit 218 also transfers from RAM 210 to RAM 200 the first receive address in sequence, which is the address of the set of phase shift values, the set of attenuation values, and the set of frequency band tracking values to adjust filter 30 for the first receive focal zone, and the index value corresponding to the scan line number received from scan converter 36. Upon receipt of the XDR ACQ signal, TSC circuit 218 also transfers from RAM 210 to RAM 202 the second receive address in sequence, which is the address of the set of phase shift values, the set of attenuation values, and the set of frequency band tracking values to adjust filter 31 for the second receive focal zone, and the index value corresponding to the scan line number received from scan converter 36. RAM 208 stores the depth values of the boundaries of the receive focal zones in sequence, the initial state of zone select switch 32, and the boundaries of each transmit focal zone with identifying tag. Upon receipt of the XDR ACQ signal, TSC circuit 218 also transfers from RAM 208 to zone select switch 32 its initial state, transfers to a zone boundary (ZB) register 229 the first receive focal zone defining depth value in sequence, and transfers to video processor 34 over a data bus 228 the parameters for setting its values. Upon receipt of the XDR ACQ signal, TSC circuit 218 also searches in RAM 208 to find the identifying tag for the transmit focal zone received from scan converter 36 and transfers from RAM 208 to an acquisition period register 239 the boundary values for this transmit focal zone. Upon receipt of the XDR ACQ signal, TSC circuit 218 also transfers from RAM 206 to multiplexing network 12 the settings for switches 44 and 52 over a data bus 230. TSC circuit 218 controls the transfer of the addressed set of indexed phase shift values from RAM 204 to transmit pulse generator 24 over a data bus 224 to introduce the time delays required to focus the transmitted beam in the selected zone, controls the transfer of the addressed set of indexed phase shift values and addressed set of indexed attenuation values from RAM 200 to delay modules 16 and 18 over a data bus 226, as represented by FIG. 9F, to program delay modules 16 and 18 so as to introduce the delays and attenuations required to shape the received echo in the first focal zone, controls the transfer of the addressed set of indexed phase shift values and addressed set of indexed attenuation values from RAM 202 to delay modules 20 and 22 over a data bus 227, as represented by FIG. 9G, to program delay modules 20 and 22 so as to introduce the delays and attenuations required to shape the received echo in the first focal zone, controls the transfer of the frequency band tracking values from RAM 200 to filter 20 over data bus 226 to track the frequency shifts of the received echoes, controls the transfer of the frequency band tracking values from RAM 202 to filter 31 over data bus 226 to track the frequency shifts of the received echoes, sets zone select switch 32 to connect delay modules 16 and 18 to video processor 34, and then sends a XDR READY signal to scan converter 36 over a bus 231, as represented by FIG. 9C.

Figure 7:
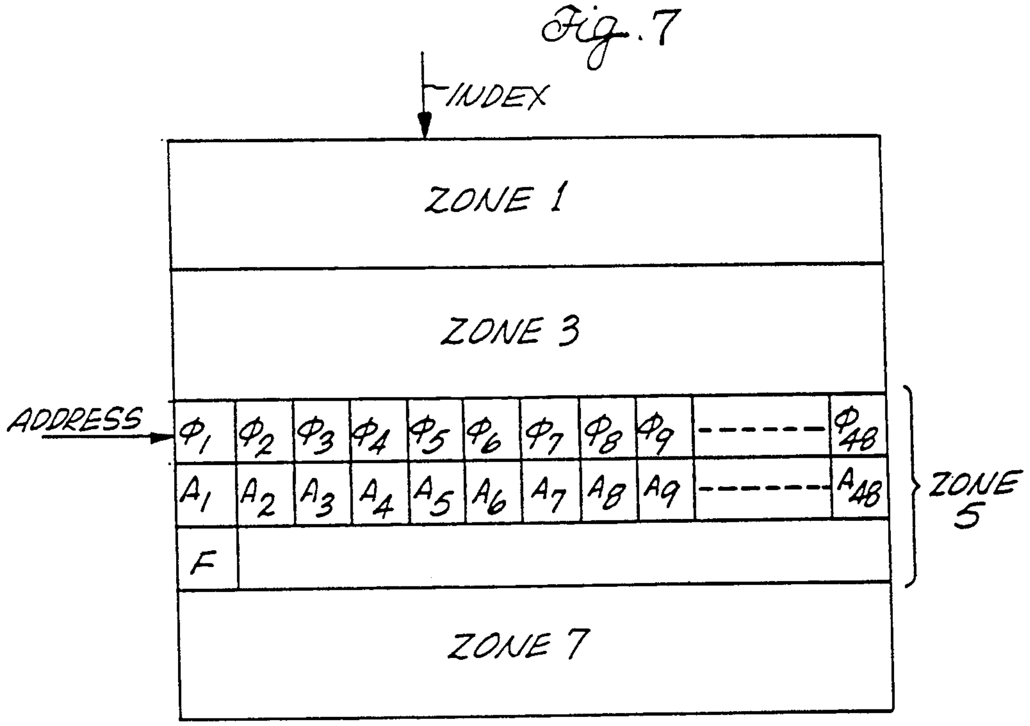
FIG. 7 is a diagram illustrating how the data in the receive rotate RAM's of FIG. 6 is stored and addressed.
Figure 8:
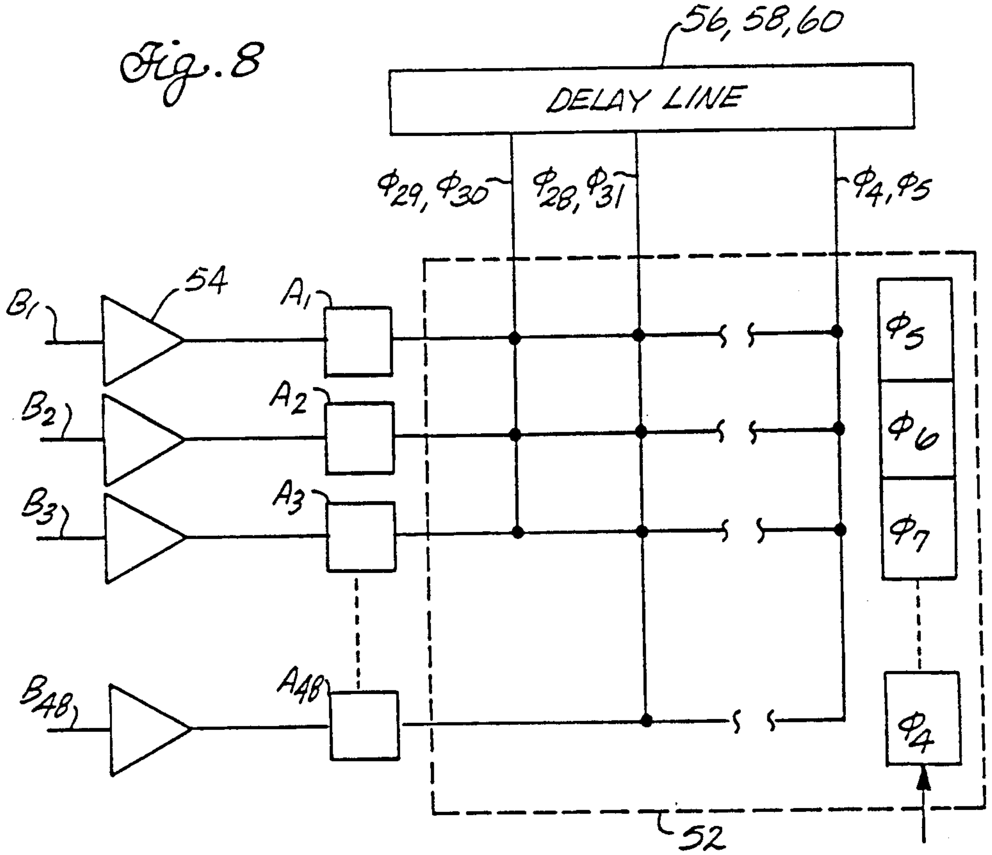
FIG. 8 is a diagram illustrating how the data retrieved from the receive rotate RAM's programs the cross point switches of the delay modules.

FIG. 7 depicts the functional organization of the phase shift and attenuation files in RAM 200 or RAM 202. To simplify the explanation, it is assumed that there is only one bank of data files. The phase shift and attenuation values of the successive receive focal zones, e.g., zones 1, 3, 5, and 7, in the case of RAM 200, are located in storage areas of the RAM having successive addresses, e.g., the address of the storage area for zone 5 follows the address of the storage area for zone 3. As illustrated for zone 5, in the storage area for each zone are stored a set of forty eight phase shift values in successive storage cells designated O1, O2, O3, O4, O5, O6, O7, O8, O9, . . . O48, a set of forty eight attenuation values in successive storage cells designated A1, A2, A3, A4, A5, A6, A7, A8, A9, . . . A48, and a frequency band setting value F. As each receive address is sequentially transmitted from RAM 210 to RAM 200s and 202, as illustrated by the arrow labelled "ADDRESS", the corresponding storage area is accessed to read out the set of phase shift values and the set of attenuation values in successive cells in increasing value in order beginning with the cell at the index value, as illustrated by the arrow labelled "INDEX", e.g. cells 5, 6, 7, 8, . . . 48, 1, 2, 3, 4. In general, when the end segments of the transducer aperture rotate in one direction from elements 1 and 48, the index value rotates the same number of elements in the other direction. For example, when the end segments of the maximum aperture rotate counterclockwise by four elements from elements 48 and 1 to elements 44 and 45, the index rotates clockwise by four elements from element 1 to element 5, as illustrated in FIG. 7. The read out phase shift values are transferred in the same order to the address registers of cross point switch 52 of the applicable RAM (200 or 202), as shown in FIG. 8. Cross point switch 52 has an address register for each horizontal row. The phase shift value transferred to each register serves as am address to determine which vertical column(s) is connected to such horizontal row. As a result, the channels are routed to the appropriate delay line taps to introduce the specified phase shifts.

After receipt of the XDR READY signal, scan converter 36 sends a XDR FIRE signal to STC circuit 218 over bus 225 and to transmit pulse generator 24, as represented by FIG. 9D, over a bus 241 (FIG. 1) to excite the elements of the transducer to transmit a burst of ultrasound energy. Responsive to the XDR FIRE signal, the ACQ ENABLE signal is set, as illustrated in FIG. 9E, for a data acquisition period that depends upon the number and locations of the transmit focal zones selected, as described in detail below. In the example of FIG. 9E, the ACQ ENABLE signal is set at skin line and reset at the end of receive zone 4, which corresponds to a first transmit focal zone at zone 4 and a second transmit focal zone at zone 5.

A depth clock 231 is synchronized to system clock 33. Clock 231 most conveniently produces depth clock pulses at a frequency in one-to-one ratio to the velocity of sound propagation through body tissue, e.g. one depth clock pulse per millimeter or other unit of length. A depth counter 232 counts the depth clock pulses occurring after the XDR FIRE signal, starting from zero at "skin line". The boundary values of the transmit focal zones and the receive focal zone boundary values are expressed in terms of depth clock pulse count from skin line.

As a result of the initial state of zone select switch 32 stored in RAM 208, delay modules 16 and 18 process the echo signal, as represented by FIG. 9F, and delay modules 20 and 22 are in a stand by state, as represented by FIG. 9G. Next, the count of counter 232 is compared with the first focal zone boundary value in ZB register 229 to determine when to set zone select switch 32 to connect delay modules 20 and 22 to video processor 34. When the two are equal, a control signal is sent to zone select switch 32 over a bus 238 to change its state accordingly, so delay modules 16 and 18 are reprogrammed, as represented by FIG. 9F, and delay modules 20 and 22 process the echo signal, as represented by FIG. 9G. TSC circuit 218 also sequences RAM 210 to the next address in RAM 200 and sequences RAM 208 to transfer to ZB register 229 the second focal zone boundary value. In this fashion, modules 16 and 18 and modules 20 and 22 alternately receive the echo signal and are then reprogrammed at the focal zone boundaries until the echo signal has been acquired over the entire field of view, e.g. eight focal zones. Each time modules 16 and 18 are reprogrammed, filter 30 is also reprogrammed to track the frequency shift. Each time modules 20 and 22 are reprogrammed, filter 31 is also reprogrammed to track the frequency shift. Then, the XDR ACQ, XDR READY, XDR FIRE and ACQ ENABLE signals are reset, as illustrated in FIGS. 9B, 9C, and 9D and the ACQ ENABLE signal opens switch 68. The ACQ ENABLE signal is sent by a bus 240 to scan converter 36 to signal scan converter 36 when to form a scan line or a scan line segment of the display from the video processor 34. Thereafter, the described process is repeated responsive to the next unblanking pulse.

The ACQ ENABLE signal is set and reset as follows. At the last scan line segment acquired by scan converter 36, scan converter 36 sends a last zone signal to TSC circuit 218 over a bus 241 to latch a last zone register therein (not shown) after the XDR FIRE signal is set. The last zone register remains latched until after the SCR FIRE signal of the next scan line segment, which signals the start of the next scan line. Thus, when the last zone register is latched, at the occurrence of the XDR FIRE signal or the next scan line segment, which is the start of the next scan line, the ACQ ENABLE signal is set and the acquisition period begins at skin line, as represented in FIG. 9E, and ends when scan converter 36 resets the XDR ACQ signal, as represented in FIG. 9B, which is sent to TSC circuit over bus 225 to reset the ACQ ENABLE signal and end the acquisition period, and to reset the XDR READY and XDR FIRE signals as well, as illustrated in FIGS. 9E, 9C, and 9D. If the operator selects only one transmit focal zone for the display, the ACQ ENABLE signal is set and reset as described above. If the operator selects more than one transmit focal zone for display, then the ACQ ENABLE signal for the first zone is set and the ACQ ENABLE signal for the last zone is reset as described above. The other ACQ ENABLE signals are set and reset responsive to the transmit focal zone boundary values transferred from RAM 208 to register 239. For example, if the operator selects two transmit focal zones, the count of counter 232 is compared with the upper boundary value of the first transmit focal zone stored in register 239. When the two are equal, the acquisition period of the first transmit focal zone ends and the ACQ ENABLE signal is reset as illustrated in FIG. 9E. This also resets the XDR, ACQ, XDR READY and XDR FIRE signals for the next transmit cycle. Then, the count of counter 232 is compared with the lower boundary value of the second transmit focal zone. When the two are equal, the acquisition period of the second transmit focal zone begins and the ACQ ENABLE signal is set as illustrated in FIG. 9E. If the operator selects three or more transmit focal zones, the count of counter 232 is compared with the lower and upper boundary values of each intermediate transmit focal zone stored in register 239 to set and reset the ACQ ENABLE signals for such transmit focal zones. In summary, if the last zone register is latched during the last scan line segment, the upper boundary value in register 239 is ignored by TSC circuit 218 and the ACQ ENABLE signal is reset by the resetting of the XCR ACQ signal; if the last zone register is latched during the first scan line segment, the lower boundary value in 239 is ignored by TSC circuit 218 and the ACQ ENABLE signal is set as skin line by the FIRE XDR signal. During the intermediate scan line segments the ACQ ENABLE signal is set and reset responsive to the lower and upper boundary values, respectively, in register 239.

Figure 10:
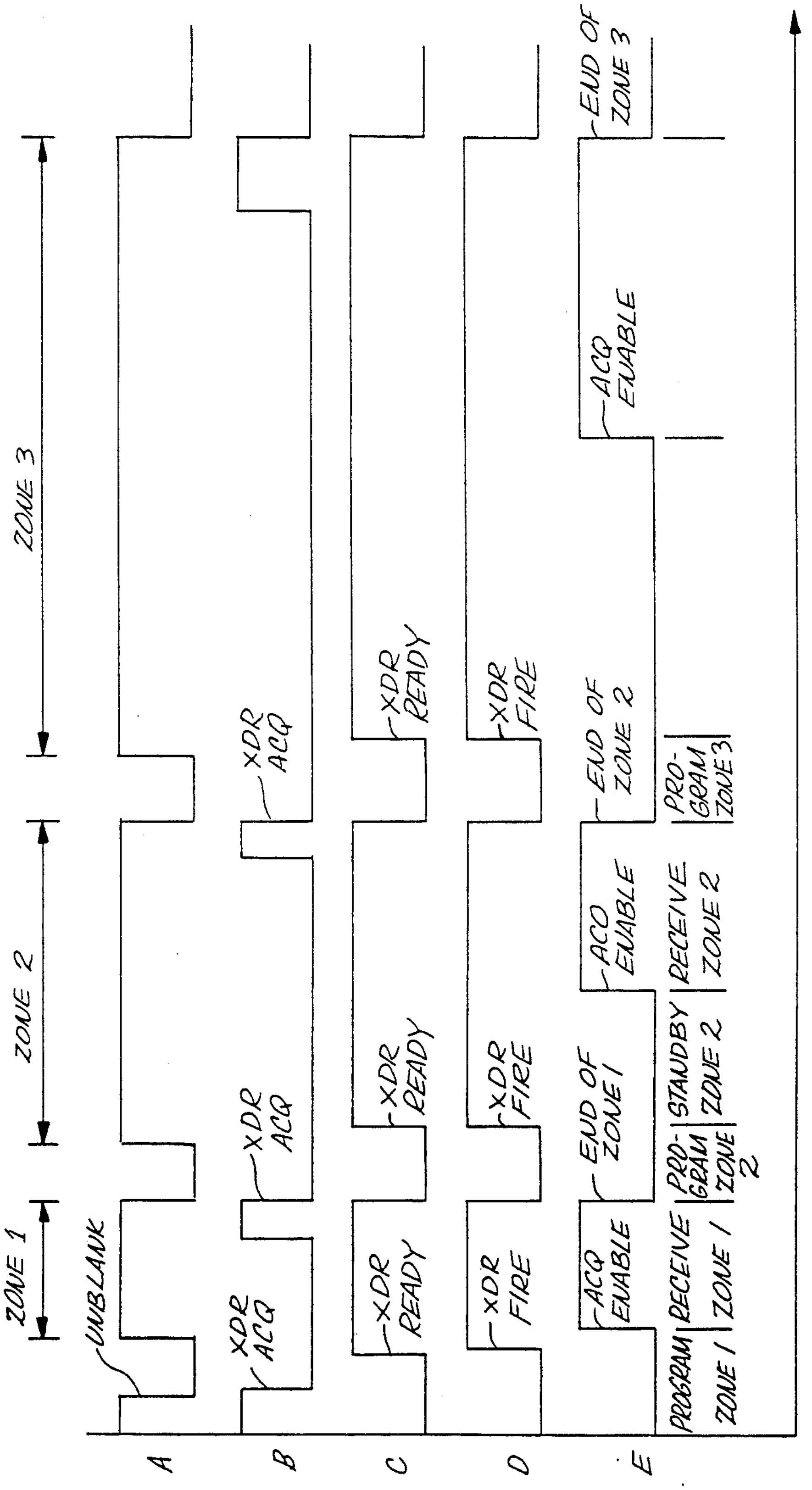

When the composite mode flag bits are set, the following operations are started by each negative going pulse transition of the unblinking signal generated by scan converter 36 for video display terminal 38, as represented by FIG. 10A. The transmit beam focal zone and the receive beam focal zone data, which are generally the same, the scan line number data, and the scan line type data are sent to RAM 210 over data bus 223 and, as represented by FIG. 10B, scan converter 36 sends a XDR ACQ signal over bus 225 to TSC circuit 218 to request a new scan line segment for display. Thereupon, real time controller 37 begins to program transmit pulse generator 24 and one or more of focus modules 16 to 22. RAM 210 stores the address in RAM 204 of the set of transmit phase shift values for each of a plurality (e.g., eight) of transmit beam focal zones with a transmit identifying tag. RAM 210 also stores the index value for each scan line number. Upon receipt of the XDR ACQ signal, TSC circuit 218 searches in RAM 210 to find the transmit identifying tag for the transmit focal zone received from scan converter 36, transfers from RAM 210 to RAM 204 the address of the set of transmit phase shift values having this identifying tag, and transfers from RAM 210 to RAM 204 the index value corresponding to the scan line number received from scan converter 36. RAM 210 also stores the address in RAM 200 and/or RAM 202 if the set of receive phase shift values, the set of attenuation values, and the set of frequency band tracking values of filter 30 or 31 for each of the plurality of receive focal zones with a receive identifying tag. Upon receipt of the XDR ACO signal, TSC circuit 218 also searches RAM 210 to find the receive identifying tag for the receive focal zone received from scan converter 36, transfers from RAM 210 to RAM 200 and/or RAM 202 the address of the set of receive phase shift values, the set of attenuation values and the set of frequency band tracking values of filter 30 or 31 having this identifying tag, and transfers from RAM 210 to RAM 200 and/or RAM 202 the index vale corresponding to the scan line number received from scan converter 36. RAM 208 stores the state of zone select switch 32. Upon receipt of the XDR ACQ signal, TSC circuit 218 also transfers from RAM 208 to zone select switch 32 its state and transfers to video processor 34 over data bus 228 the parameters for setting its values. Upon receipt of the XDR ACQ signal, TSC circuit 218 also transfers from RAM 206 to multiplexing network 12 the settings for switches 44 and 52 over data bus 230. TSC circuit 218 controls the transfer of the indexed set of transmit phase shift values to transmit pulse generator 24 over data bus 224 to introduce the time delays required to focus the transmitted beam in the selected zone, controls the transfer of the indexed set of receive phase shift values and indexed set of attenuation values to delay modules 16 and 18 over data bus 226 to program delay modules 16 and 18 and/or the transfer of the indexed set of receive phase shift values and indexed set of attenuation values to delay modules 20 and 22 over data bus 227 to program delay modules 20 and 22 so as to introduce the delays and attenuations required to shape the received echo in the receive focal zone, controls the transfer of the frequency band tracking values from RAM 202 to filter 30 or 31 over data bus 226 to track the frequency shifts of the received echoes, sets zone select switch 32 to connect delay modules 16 and 18 and/or delay modules 20 and 22 to video processor 34, and then sends a XDR READY signal to scan converter 36 over a bus 231, as represented by FIG. 10C. After receipt of the XDR READY signal, scan converter 36 sends a XDR FIRE signal to STC circuit 218 over bus 225 and to transmit pulse generator 24, as represented by FIG. 10D, over bus 241 (FIG. 1) to excite the elements of the transducer to transmit a burst of ultrasound energy. The ACQ ENABLE signal is then set at the appropriate time to acquire the echo signal received from the portion of the field of view corresponding to the selected transmit focal zone.

The ACQ ENABLE signal is set and reset as described above in connection with the dynamic receive focus mode. As illustrated in FIG. 10E in the case of three transmit focal zones, for the first transmit zone at zone 1 the ACQ ENABLE signal is set at skin line. After the ACQ ENABLE signal is reset, the delay modules are reprogrammed for zone 2, the transducers are fired, and after a standby delay that permits the echo to return to the transducer from the selected focal zone, the ACQ ENABLE signal is set to acquire the received echo from zone 2. After the ACQ ENABLE signal is reset, the delay modules are reprogrammed for zone 3, the transducers are fired, and after a standby delay that permits the echo to return to the transducer from zone 3, the ACQ ENABLE signal is set to acquire the received echo from zone 3. The described process is repeated for each selected transmit zone. As previously described, at the end of the last transmit focal zone of the scan line the ACQ ENABLE signal is reset by the XDR ACQ signal sent from scan converter 36.

A comparison of FIGS. 9F and 9G with FIG. 10E illustrates the difference between the dynamic receive and composite modes. In the former, real time controller 37 alternately programs one pair of delay modules while connecting the other pair of delay modules to video processor 34. In the latter, real time controller 37 first programs one or more of the delay modules and then connects such delay module to video processor 34. The system is capable of achieving a higher frame rate and/or better image quality for the display in the dynamic receive focus mode if fewer than all the transmit focal zones are selected.

Figure 11:
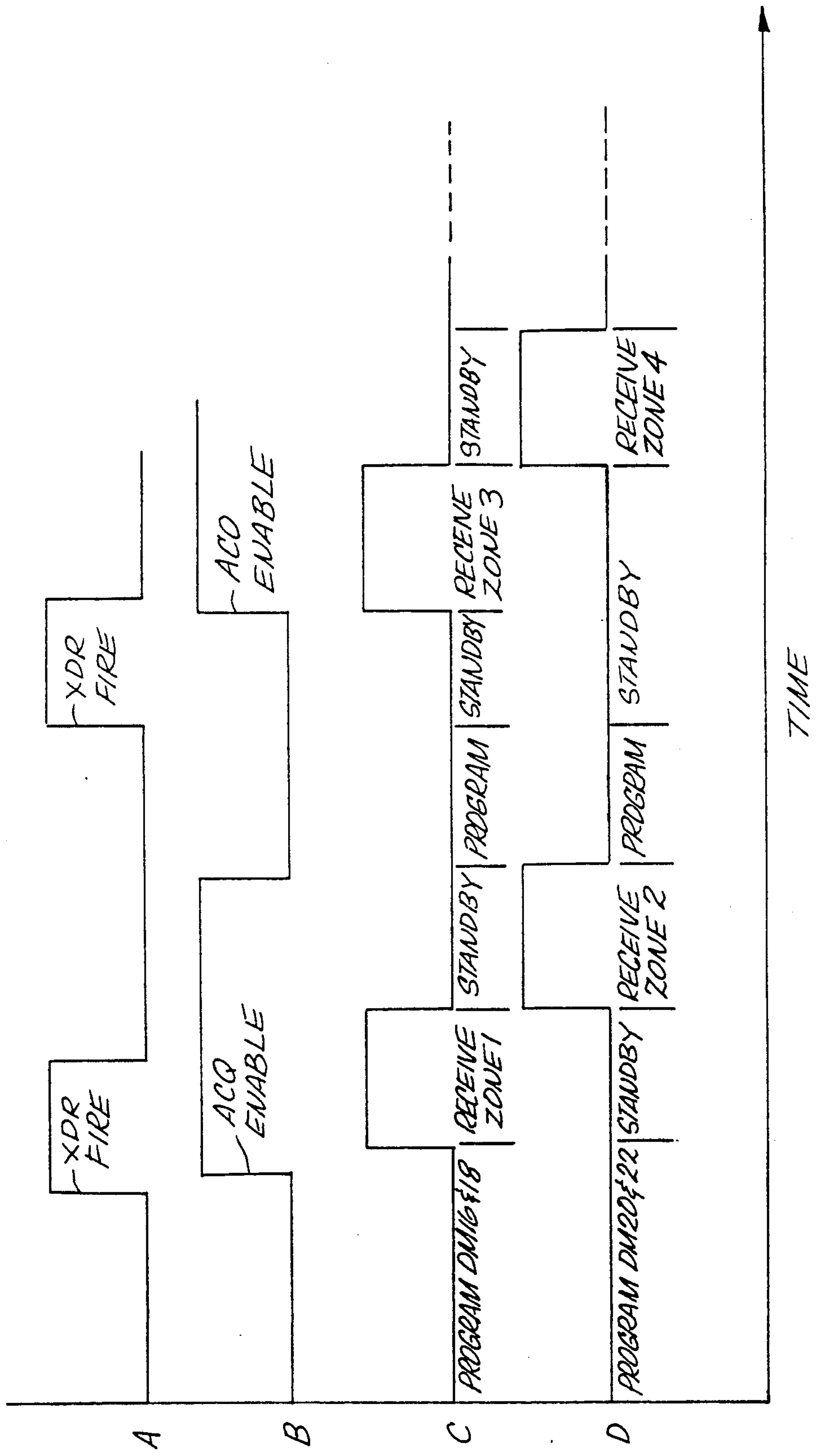

When the pseudo DRF mode flag bits are set, the operation is a hybrid of above described dynamic receive focus (DRF) and composite modes. One or more transmit focal zones and corresponding scan line segments are selected from control panel 39. Assuming a maximum eight receive focal zones, there are four transmit focal zones. For each transmit focal zone, there are two receive focal zones about which the transmit focal point is generally centered. All four delay modules are programmed at the same time as at the start of the DRF mode and then each pair of delay modules is connected to video processor 34 successively responsive to the depth clock count, while the other pair of delay modules is in standby status as during the first two cycles of the DRF mode. Thereafter, the delay modules are all reprogrammed for the next transmit focal zone as in the composite mode and the process is repeated. The ACQ ENABLE signal is set and reset as described above in connection with the dynamic receive focus mode, four receive focal zone boundary values being stored in RAM 208 for each transmit focal zone, namely values corresponding to the upper and lower boundaries of each pair of receive focal zones. FIG. 11 illustrates the operation of the pseudo DRF mode.

Figure 12:
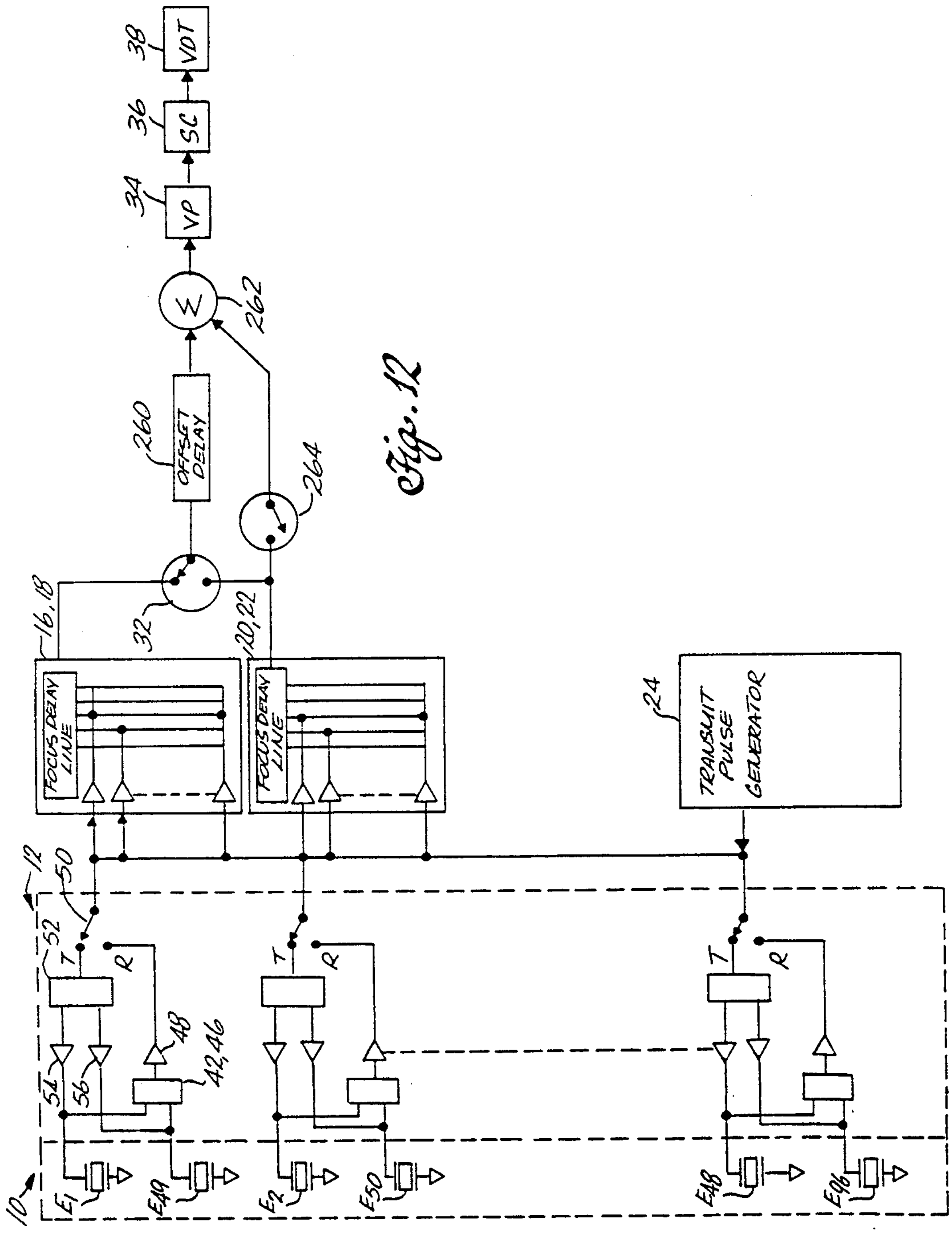
FIG. 12 is a schematic block diagram of an alternative embodiment of an ultrasound imaging system illustrating the principles of the invention.

FIG. 12 discloses another, presently preferred embodiment of an arrangement for connecting delay modules 16 to 22 to video processor 34. Components common to the embodiment of FIGS. 1, 2, and 3 bear the same reference numerals. Instead of daisy bus, delay modules 16 and 18 are permanently connected in series to one terminal of zone select switch 32 and delay modules 20 and 22 are permanently connected in series to the other terminal of zone switch 32. Zone switch 32 is connected by an offset delay 260 to one input of a summing junction 262. The series connection of delay modules 20 and 22 is connected through an open/closed switch 264 to the other input of summing junction 262. The output of summing junction 262 is connected to video processor 34. In the dynamic receive focus and pseudo DRF modes, switch 264 is open and zone switch 32 toggles back and forth as the receive focus zones change. In the composite mode, zone switch 32 remains connected to delay modules 16 and 18 in series and switch 264 is closed. As a result, the range of possible phase shifts is enlarged. The channels routed to delay modules 16 and 18 are all phase shifted a constant amount by offset delay 260 relative to the channels routed to delay modules 20 and 22.

The described embodiment of the invention is only considered to be preferred and illustrative of the inventive concept; the scope of the invention is not to be restricted to such embodiments. Various and numerous other arrangements may be devised by one skilled in the art without departing from the spirit and scope of this invention.

What is claimed is:

1. A method for focusing a beam of received echoes in a multiple transducer ultrasound imaging system having first programmable means for selectively phase shifting and combining elemental echo signals and second programmable means for selectively phase shifting and combining elemental echo signals, the method comprising the steps of in the order recited:
   - simultaneously programming the first and second means;
   - applying elemental echo signals to the first means to focus the beam in one zone; and
   - applying the elemental echo signals to the second means to focus the beam in another zone.

* * * * *